Aug. 15, 1961 B. WOLSH 2,996,073
WATER LOCK VALVE FOR GASOLINE STORAGE TANK
Filed Aug. 11, 1959 2 Sheets-Sheet 1

INVENTOR.
BERNARD WOLSH
BY
Sanford Schnurmacher
ATTORNEY.

Aug. 15, 1961 B. WOLSH 2,996,073
WATER LOCK VALVE FOR GASOLINE STORAGE TANK
Filed Aug. 11, 1959 2 Sheets-Sheet 2
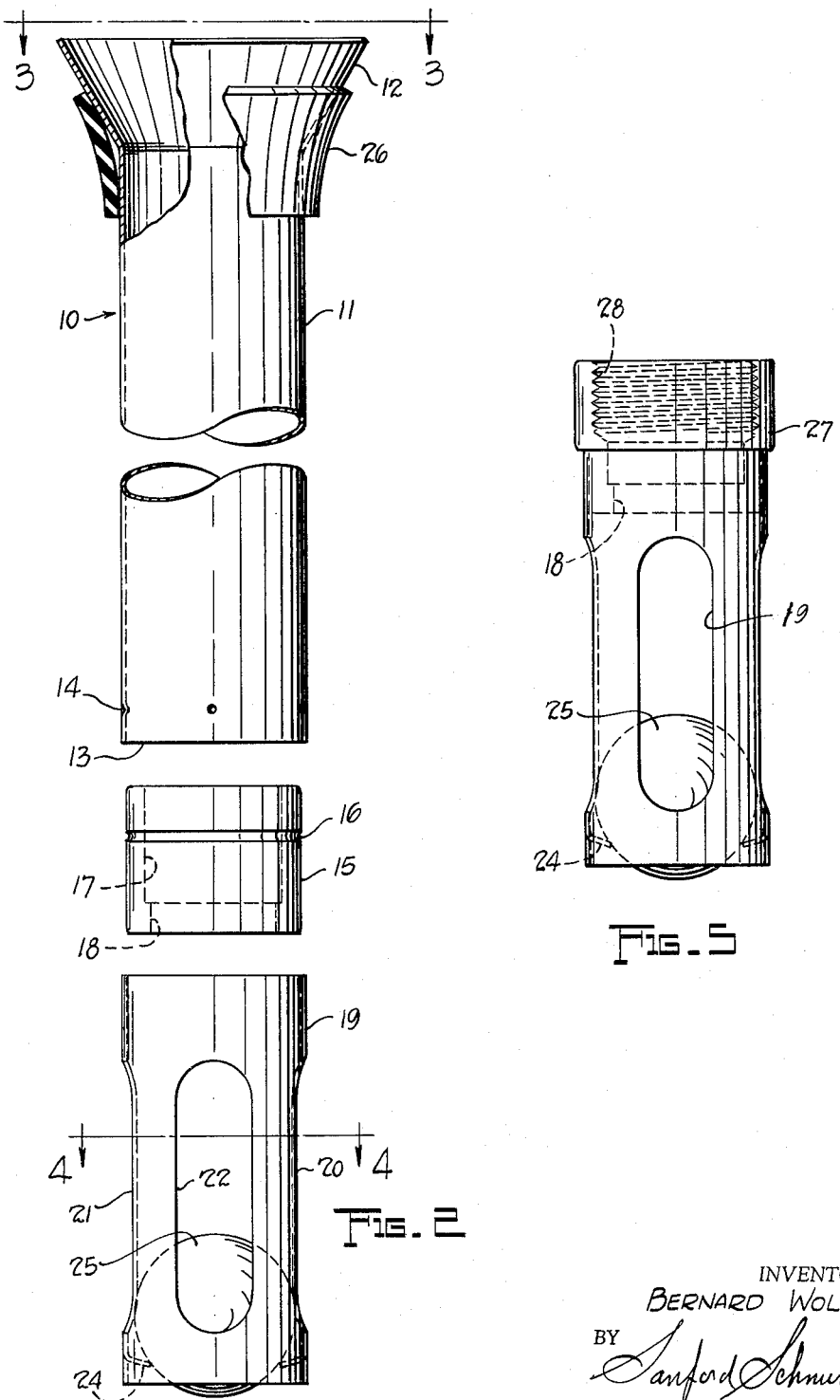
INVENTOR.
BERNARD WOLSH
BY Sanford Schnurmacher
ATTORNEY.

United States Patent Office 2,996,073
Patented Aug. 15, 1961

2,996,073
WATER LOCK VALVE FOR GASOLINE
STORAGE TANK
Bernard Wolsh, 2350 Fenwood Road,
University Heights 18, Ohio
Filed Aug. 11, 1959, Ser. No. 832,999
1 Claim. (Cl. 137—172)

This invention relates to liquid level responsive excluding devices, and particularly to a water-lock valve for gasoline storage tanks.

Conducive to a better understanding of this invention it may be well to point out that when gasoline is stored in large quantities for dispensing at island pumps of service stations the problem of contamination by water is an ever present one. Water may enter the half filled tank by condensation of the water vapor in the air which enters the tank as gasoline is withdrawn. Again, since most of such tanks are buried under ground, there arises the possibility of ground water seepage due to corrosion, accident, or flooding of the service area.

Water, being heavier than gasoline, sinks to the bottom of the tank where a clear demarcation line between the water and gasoline is formed. For this reason the suction pipes for the withdrawal of gasoline from such tanks are usually set with their intake ends approximately 3 inches above the floor of the storage tank. This permits a water layer to form below the intake end so that only gasoline will be withdrawn as long as the water depth remains below the intake opening. The tank must be checked periodically, and if the water level becomes too high steps must be taken to drain off the water.

If through neglect or carelessness the water level rises to the suction pipe inlet there is danger that water will be mixed with the withdrawn gasoline, thereby creating a situation that may result in the freezing up of the gas lines or carburetor of an automobile into whose tank such a contaminated mixture may have been delivered.

The primary object of this invention, therefore, is to provide a water-lock valve for gasoline storage tanks that will automatically cut off the flow of liquid when the water level reaches a predetermined heighth.

Another object is to provide a device of the type stated that may be attached to existing installations without requiring any alteration in the tank or piping layout.

A further object is to provide a device that can be adapted for use with storage tanks of any depth.

Still another object is to provide a water-lock valve that can be installed inside an existing storage tank suction pipe without disturbing it or its associated structure.

These and other objects of the invention will become apparent from a reading of the following specification and claim, together with the accompanying drawings, wherein:

FIGURE 2 is an exploded view of the water-lock valve assembly;

FIGURE 5 is a side elevation of a modified form of the device, as used for new installations.

Figure 1:
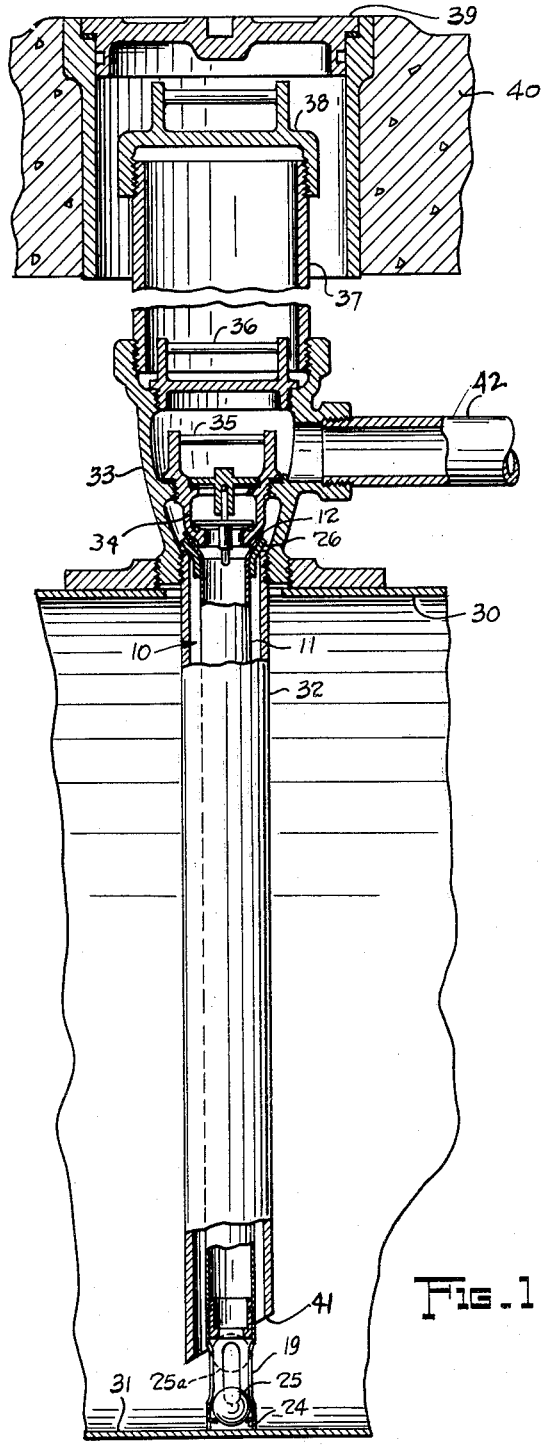
FIGURE 1 is a vertical sectional view of a typical gasoline storage tank installation, showing the water-lock valve that is the subject of this invention positioned within the suction pipe of the storage tank.
Figure 3:
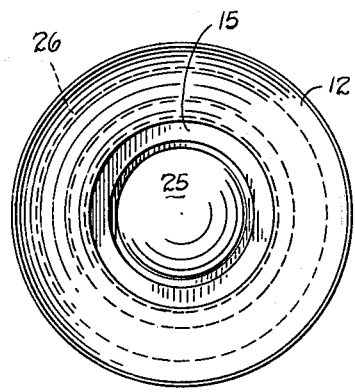
FIGURE 3 is a top plan view of the same, taken along the line and in the direction of the arrows 3—3 of FIGURE 2.
Figure 4:
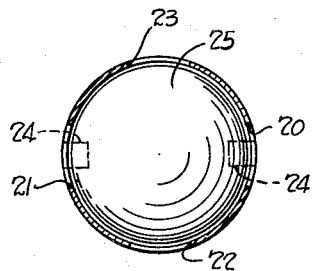
FIGURE 4 is a sectional view of the ball sleeve, taken along the line and in the direction of the arrows 4—4 of FIGURE 2.

Referring more particularly to FIGURE 1 of the drawings, there is seen the water-lock valve that is the subject of this invention, broadly indicated by reference numeral 10, as it appears when mounted within the suction tube, or pipe 32 of an existing gasoline storage tank 30.

In a typical installation, such as that shown, the tank 30 is buried in the ground 40 some distance from the dispensing pumps, not illustrated.

A vertical suction tube 32 is mounted through the top of the tank 30 in the inlet of a check valve housing 33. Reference numeral 34 indicates the check valve cage which is mounted within said housing and acts to prevent back-flow of gasoline into the tank 30. A delivery pipe 42 carries the gasoline from the check valve housing to the dispensing pump.

Reference numeral 36 indicates the check valve housing cover which seals off the check valve. A stand pipe 37 extends from the check valve housing to the surface of the ground 40 where it terminates beneath a manhole cover 39. The top of the stand pipe 37 is capped by a cover 38. The check valve cage 34 may be reached for removal by opening the manhole cover 39 and unscrewing the stand pipe and check valve housing covers 38 and 36, respectively.

The suction pipe 32 is cut at an upwardly extending angle at its lower end 41. The end 41 is usually located about 3 inches above the tank floor 31, as shown in FIGURE 1. This allows space for a layer of water to accumulate below the intake 41, which only draws in gasoline as long as the water level remains below the entrance 41 of the tube 32.

However, when the water reaches the level of 41 it will be sucked into the suction tube 32 along with the gasoline.

Referring to FIGURE 2 there is seen an exploded view of the water-lock valve 10 that is the subject of this invention.

The device comprises a tubular casing 11, having a flared upper end 12 and an overall length depending upon the depth of the tank with which it is to be used, as explained hereinafter. Since the casing 11 is intended to be slipped inside the suction tube 32 its outside diameter must be such that it will slidably interfit the tube 32.

A flexible gasket 26, made of any suitable material that is impervious to gasoline, is positioned at the flared end 12 of the casing 11.

Reference numeral 15 indicates a brass collar having a bore 17 therethrough and a downwardly faced valve seat 18. The collar has a circumferential groove that is intended to be engaged by dimples 14 at the bottom end 13 of the casing 11, when the collar is fitted therein.

Reference numeral 19 indicates a tubular sleeve, open at both ends, of the same diameter as the casing 11, and adapted to be tightly fitted over the lower end of the collar 15, as seen in FIGURE 1. The sleeve 19 has four vertically extending and laterally spaced slots 20, 21, 22 and 23 in the wall thereof. The width and length of the slots is made as large as possible, consistent with structural rigidity, in order to freely admit liquid to the interior of the sleeve 19. Two in-turned fingers 24 are positioned at the lower end of the sleeve, which act as retaining means for the valve ball 25.

Reference numeral 25 indicates a valve ball whose specific gravity is such that it will float in water and sink in gasoline. In its preferred form, the ball 25 is hollow and made of a noncorrosive material such as copper or plastic. A hole is made in the ball and enough shot is added to give it the required specific gravity, after which the hole is sealed up. The ball 25 is then placed within the sleeve 19. The so adjusted ball is free to move vertically of the sleeve between a first position wherein it rests on the retaining fingers 24, and a second position, wherein it engages the valve seat 18. The diameter of the ball is such that it will seal the valve seat 18 when in its second position.

To install the water-lock valve 10 in an existing gasoline storage tank system, such as described hereinabove, the following procedure is taken:

The manhole cover 39 is opened and the stand-pipe and check valve housing covers 38 and 36, respectively, are unscrewed. The check valve cage 34 may then be easily unscrewed from its housing by means of a special wrench which engages its handle 35. This gives clear access to the suction pipe 32. The distance from the top of the suction tube 32 to the bottom 31 of the tank 30 is then determined, and the casing tube 11 is cut to such a length that when the collar 15 is fitted into the end thereof the bottom of the sleeve 19 will be at the floor 31 of the tank 30, as seen in FIGURE 1.

The assembled unit 10 is then dropped into the suction tube 32. When properly fitted, the gasket 26 at the flared top 12 of the casing 11 will seat on the top end of the suction tube 32. The check valve cage 34 is then screwed back into its housing 33 until its bottom beveled face is firmly seated against the inner face of the flared end 12 of the casing 11. This creates a liquid tight seal between the top end of the suction tube 32 and the gasket 26 at the flared upper end 12 of the casing 11, whereby the casing 11, in effect, replaces the suction tube 32 as a means for delivering liquid to the check valve 34. The installation is completed by replacing the several covers 36, 38 and 39. It will thus be evident that the installation of the water-lock valve 10 in an existing system is both simple and quick, requiring no alterations in an existing structure.

When the tank 30 is filled with gasoline only, the valve ball 25 will rest on the fingers 24 at the bottom of the sleeve 19, as shown in solid outline in FIGURE 1. The gasoline from the tank 30 enters the casing tube 11 through the slots 20, 21, 22 and 23 of the sleeve 19.

As water accumulates in the tank 30 a sharp demarcation line between the water and gasoline is formed. Since the ball 25 will float in water, it will move upward with the waterline until it reaches the position 25a, as seen in FIGURE 1, in which it is tightly pressed against the valve seat 18, by both its own buoyancy in the water and the suction in the casing 11, thereby effectively cutting off the flow of liquid. The suction in the casing 11 will pick up the ball 25 and seal the valve just before the water level is actually at the valve seat 18, so that no water contaminated gasoline will be delivered before the operator is put on notice by the failure of gasoline flow at the pump. When that happens the operator must drain out the water, before the ball 25a will drop away from the valve seat 18, so that normal gasoline delivery can be resumed.

FIGURE 5 illustrates another embodiment of the device for use in new installations, wherein the valve collar 27 is internally threaded, as at 28, for attachment to the threaded lower end of a suction tube, not shown.

It will now be clear that there has been provided a device which accomplishes the objectives heretofore set forth.

While the invention has been disclosed in its preferred forms, it is to be understood that the specific embodiments thereof, as described and illustrated herein, are not to be considered in a limited sense, as there may be other forms or modifications of the invention which should also be construed to come within the scope of the appended claim.

I claim:

In combination with a gasoline storage tank of the type having a vertical suction tube extending downward into the tank with its upper end capped by a cage type check valve having a beveled bottom face, a water-lock valve, comprising, a casing, of an outside diameter to fit within the suction tube, and having a flared top whose upper diameter is larger than the inside diameter of the suction tube and of a conical shape matching that of the beveled bottom face of the check valve; a gasket seated between the flared top of the casing and the top edge of the suction tube and forming a fluid tight seal between the casing and suction tube when the bottom face of the check valve is screwed home against the flared top of the casing; a cylindrical collar mounted within the casing at the lower end thereof having an outside diameter equal to that of the inside diameter of the casing, the collar having a circumferential groove above its mid-point engaged by a plurality of dimples struck inwardly of the lower edge of the casing, the collar also having a bore therethrough terminating in a downwardly faced valve seat; a perforated sleeve open to the top and bottom, having the same outside diameter as the casing, mounted over the lower end of the collar in abutting engagement with the casing and forming a continuation thereof; two diametrically spaced fingers, struck inwardly of the bottom end wall of the sleeve; and, a valve ball, loosely held within the sleeve, whose specific gravity is such that it will float in water and sink in gasoline, said ball being free to move between a first position, when immersed in gasoline, wherein it rests upon the sleeve fingers, and a second position, when immersed in water, wherein it is seated against the collar valve seat, to close the casing against the entrance of liquid.

References Cited in the file of this patent

UNITED STATES PATENTS

| | | |
|---|---|---|
| 1,737,529 | Viele | Nov. 26, 1929 |
| 1,772,141 | Glass | Aug. 5, 1930 |
| 2,909,186 | Larson | Oct. 20, 1959 |